United States Patent
Mi et al.

(10) Patent No.: US 6,819,381 B2
(45) Date of Patent: Nov. 16, 2004

(54) COMPENSATION FILMS FOR LIQUID CRYSTAL DISPLAYS

(75) Inventors: Xiang-Dong Mi, Rochester, NY (US); Tomohiro Ishikawa, Rochester, NY (US); Janglin Chen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/281,595

(22) Filed: Oct. 28, 2002

(65) Prior Publication Data

US 2004/0080691 A1 Apr. 29, 2004

(51) Int. Cl.[7] .............................................. G02F 1/1335
(52) U.S. Cl. ........................ 349/117; 349/119; 349/121
(58) Field of Search .................................. 349/117–121

(56) References Cited

U.S. PATENT DOCUMENTS

| | | | | |
|---|---|---|---|---|
| 5,375,006 A | | 12/1994 | Haas | 349/120 |
| 5,557,434 A | * | 9/1996 | Winker et al. | 349/117 |
| 5,619,352 A | | 4/1997 | Koch et al. | 349/117 |
| 6,266,114 B1 | * | 7/2001 | Skarohlid | 349/119 |
| 6,320,634 B1 | * | 11/2001 | Winker et al. | 349/117 |
| 6,567,143 B1 | * | 5/2003 | VanderPloeg et al. | 349/120 |
| 2002/0187283 A1 | * | 12/2002 | Gu et al. | 428/1.2 |
| 2003/0193636 A1 | * | 10/2003 | Allen et al. | 349/117 |

FOREIGN PATENT DOCUMENTS

| | | |
|---|---|---|
| EP | 1 143 271 | 10/2001 |
| WO | 01/20392 | 3/2001 |

OTHER PUBLICATIONS

J. Chen et al, "Wide–Viewing–Angle Photoaligned Plastic Films for TN–LCDs", SID 99 Digest, pp. 98–101.

* cited by examiner

Primary Examiner—Tarifur R. Chowdhury
(74) Attorney, Agent, or Firm—Arthur E. Kluegel (57) ABSTRACT

Disclosed is an optical compensation film for improves viewing angle of twisted nematic liquid crystal display, especially in the vertical viewing direction. The said optical compensation film contains a positively birefringent material oriented with its optic axis tilted in a plane perpendicular to the film plane, wherein the phase retardation value defined by (ne-no)d is 100±20 nm at the wavelength of 550 nm and the average tilt angle relative to the film plane is 10±5°, where ne and no are the extraordinary and ordinary refractive indices, respectively, and d, the thickness of the birefringent material.

15 Claims, 9 Drawing Sheets

COMPENSATION FILMS FOR LIQUID CRYSTAL DISPLAYS

FIELD OF THE INVENTION

The present invention relates to optical compensation films applied to a twisted nematic liquid crystal display. This compensation film improves viewing angle, especially in the vertical direction. It also has a low average tilt angle, and large retardation value and thickness, therefore allows an easy manufacturing.

BACKGROUND OF THE INVENTION

The following terms have the definitions as stated below.

Optic axis herein refers to the direction in which propagating light does not see birefringence.

A-plate, C-plate and O-plate herein are the plates in which the optic axis is in the plane of the plate, perpendicular to the plate surface and tilted with respect to the plane of the plate, respectively.

Polarizer and Analyzer herein refer to elements that polarize electromagnetic wave. One closer to the source of the light is generally called polarizer while the one closer to the viewer is called analyzer.

Figure 1:
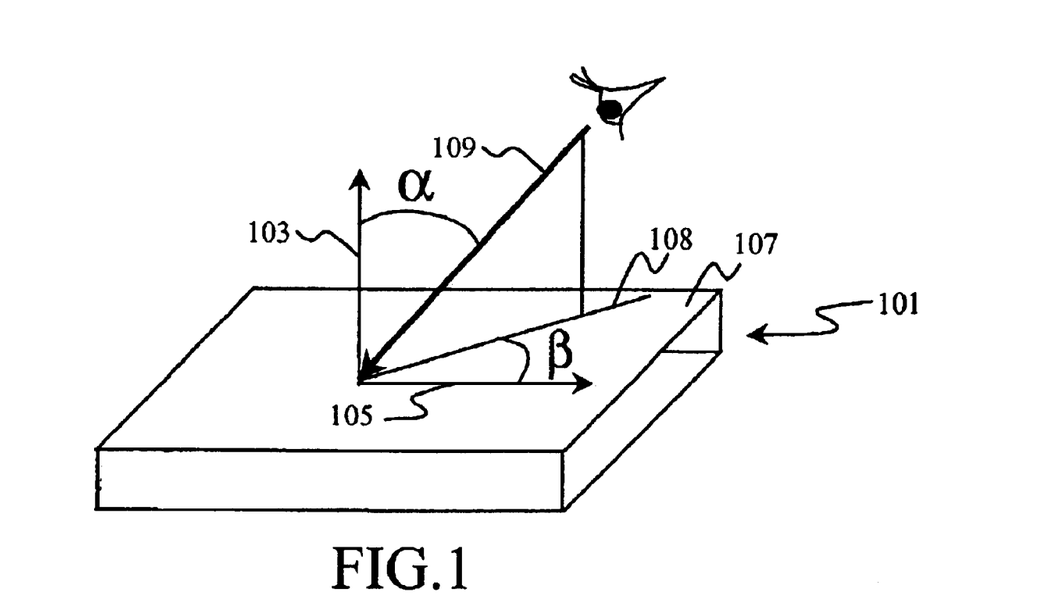
FIG. 1 shows the definition of a viewing angle direction.

Viewing direction herein is defined as a set of polar viewing angle α and azimuthal viewing angle β as shown in FIG. 1 with respect to a liquid crystal display 101. The polar viewing angle α is measured from display normal direction 103 and the azimuthal viewing angle β spans between an appropriate reference direction 105 in the plane of the display surface 107 and the projection 108 of the arrow 109 onto the display surface 107. Various display image properties, such as contrast ratio, color and brightness are functions of angles α and β.

Figure 2:
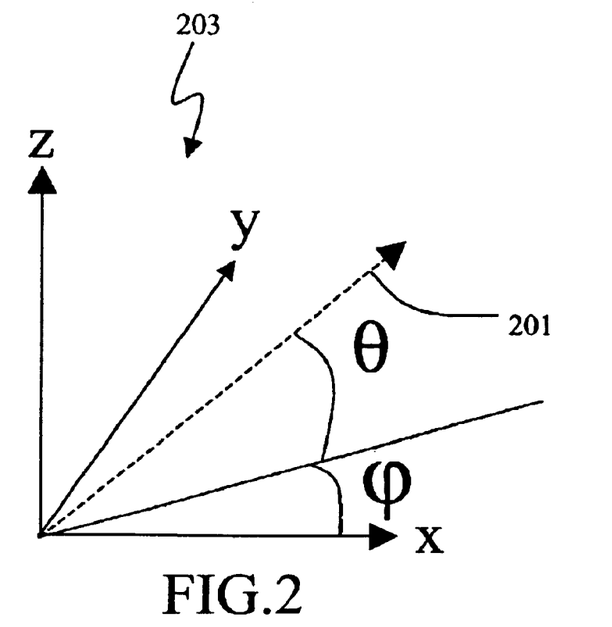
FIG. 2 shows the definition of the tilt and azimuthal angles to specify a direction of optic axis.

Azimuthal angle θ and tilt angle φ are herein used to specify the direction of optic axis. For the transmission axes of the polarizer and the analyzer, only the azimuthal angle is used as their tilt angle is zero. FIG. 2 shows the definition of the azimuthal angle φ and tilt angle θ to specify the direction of optic axis 201 with respect to the x-y-z coordinate system 203. The x-y plane is parallel to the display surface 107, and the z-axis is parallel to the display normal direction 103. The azimuthal angle φ is the angle between the x-axis and the projection of the optic axis 201 onto the x-y plane. The tilt angle θ is the angle between the optic axis 201 and the x-y plane.

ON (OFF) state herein refers to the state with (without) an applied electric field to the liquid crystal display 101.

Isocontrast plot herein shows a change in a contrast ratio from different viewing directions. Isocontrast line, on which the contrast ratio is constant (such as 10, 50 and 100), is plotted in polar format. The concentric circle corresponds to polar viewing angle α=20°, 40°, 60° and 80° (outer most circle) and the radial lines indicates azimuthal viewing angle β=0°, 45°, 90°, 135°, 180°, 225°, 270° and 315°.

Liquid crystals are widely used for electronic displays. In these display systems, a liquid crystal cell is typically situated between a pair of polarizer and analyzer. Incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source, including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, electronic games for which light-weight, low-power consumption and long-operating life are important features.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence (α=0°) to the display and falls off rapidly as the viewing angle is increased. In color displays, the leakage problem not only degrades the contrast but also causes color or hue shifts with an associated degradation of color reproduction.

LCDs are quickly replacing CRTs as monitors for desktop computers and other office or house hold appliances. It is also expected that the number of LCD television monitors with a larger screen size will sharply increase in the near future. However, unless problems of viewing angle dependence such as coloration, degradation in contrast, and an inversion of brightness are solved, LCD's application as a replacement of the traditional CRT will be limited.

Figure 3A:
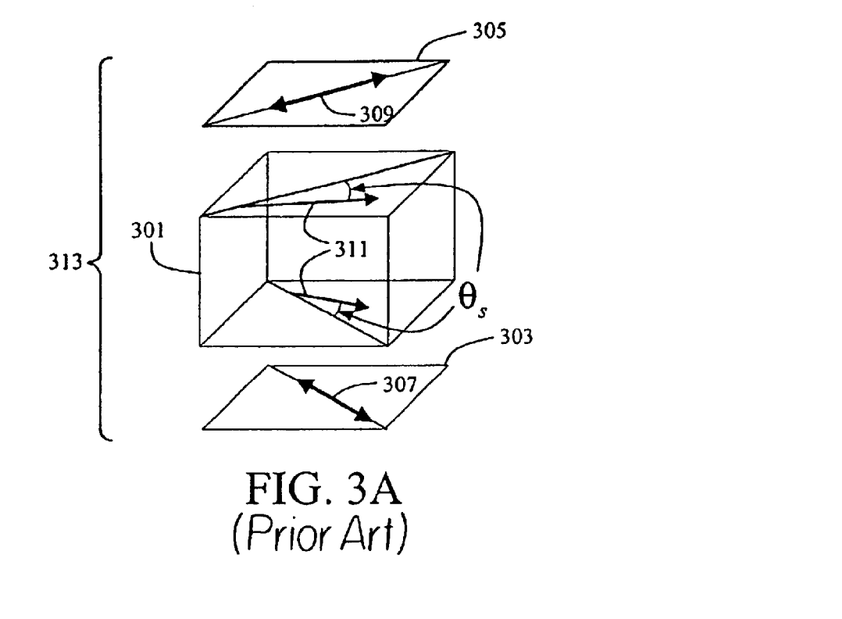
FIG. 3A is a prior art TN-LCD without compensation.

Among various modes of LCD, Twisted Nematic (TN) LCD is the most prevalent ones. FIG. 3A is a schematic of a TN-LCD 313. A liquid crystal cell 301 is positioned between polarizer 303 and analyzer 305. Their transmission axes 307, 309 are crossed, meaning that the transmission (or equivalently, absorption) axes of polarizer and analyzer form angle 90±10°. Inside the liquid crystal cell, optic axis of liquid crystal shows azimuthal rotation of 90° in the OFF state across the cell thickness direction. In FIG. 3A, the direction of liquid crystal optic axis 311 at the cell surfaces is indicated by a single head arrow. At the surface, the liquid crystal optic axes 311 form small tilt angle $\theta_s$ with respect to the cell surfaces in order to prevent the reverse twist. Namely, the tilt is consistent with the sense (clock or counter-clock wise) of the azimuthal rotation in the liquid crystal optic axis in the cell thickness direction. Un-polarized incoming light is linearly polarized by the polarizer 303 and its plane of polarization rotates 90° while traveling through the liquid crystal cell 301. The plane of polarization of out-coming light from the cell 301 is parallel to the transmission axis 309 of analyzer 305 and will transmit through the analyzer 305. With sufficiently high-applied voltage, the liquid crystal becomes perpendicular to the cell plane except in the close vicinity of the bounding plates. In this ON state, the incoming polarized light essentially does not see birefringence and thus it is blocked by the analyzer. This mode (bright OFF state and dark ON state) is called Normally White Twisted Nematic Liquid Crystal Display (NW-TN-LCD) mode.

Figure 3B:
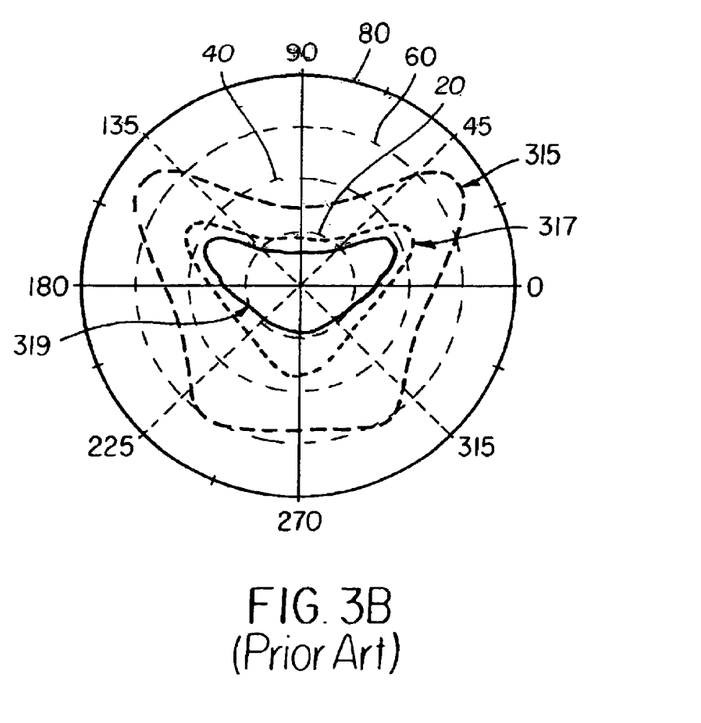
FIG. 3B is an isocontrast plot of the prior art TN-LCD shown in FIG. 3A.

In the display normal viewing direction (α=0°), one can obtain high contrast between the ON and OFF states. However, when the display is viewed from an oblique direction, the propagating light sees birefringence in ON state, thus it is not completely blocked by the analyzer. This light leakage gives low contrast ratio in the oblique direction. As is well known in the art, the degradation in the contrast ratio due to the leakage is more significant in the vertical viewing direction (azimuthal angle β=90°, 270°) than it is in the horizontal direction (β=0°, 180°) in TN-LCD. The azimuthal angle β is measured from a reference direction 205 (shown in FIG. 1), which is chosen to be at 45° relative to the transmission axes 307, 309 of the polarizer 303 and analyzer 305. The isocontrast plot of the display 313 is shown in FIG. 3B. The lines 315, 317, 319 are isocontrast ratio lines for contrast ratios 10, 50 and 100, respectively. The display fails to maintain contrast ratio 10 or higher in the range required for many applications. The contrast ratio quickly deteriorates as the viewing direction deviates from the normal direction. This deterioration is particularly significant in the upper vertical viewing direction (β=90°).

One of the common methods to improve the viewing angle characteristic of TN-LCD is to use the compensation films. In some cases, the compensation films consist of optically anisotropic layer deposited on the substrate. The substrate can be flexible film such as triacetyl-cellulose or solid such as glass. The optically anisotropic layer is generally made of liquid crystal polymers. As it is necessary to align the optic axis of the liquid crystal polymer in the desired direction (making the anisotropic layer as A, C or O-plate), an alignment layer is often deposited between the optically anisotropic layer and substrate or between the two optically anisotropic layers. The thickness of the anisotropic layer depends on the property of its constituent material and LCD to which it is applied. The compensation films are typically inserted anywhere between the liquid crystal cell and the polarizers. The function of compensation film, in general, is to undo the phase retardation experienced by the propagating light while traveling through the liquid crystal cell. By using the compensation film in the ON state of NW-TN-LCD, birefringence experienced by the obliquely propagating light is cancelled by the film. This gives us uniform dark state resulting in improved viewing angle characteristic.

Various compensation methods have been suggested. U.S. Pat. No. 5,619,352 discloses the usage of combinations of O-plates. The basic idea is to compensate the ON state of TN-LCD by a stack of O-plate that has similar or complementary optical symmetries of ON state liquid crystal cell. This was done by approximating the ON state of TN-LCD by three representative parts: two regions closed to the cell bounding plates and cell middle section. In the middle of the cell, the liquid crystal optic axis is almost perpendicular to the cell plane with large change in the azimuthal angle of liquid crystal optic axis. In the vicinity of the bounding plates, tilt in liquid crystal optic axis is small with almost fixed azimuthal angle. In comparison to the previous compensation technology, the stability of gay scale as well as viewing angle characteristic has been improved.

Figure 4A:
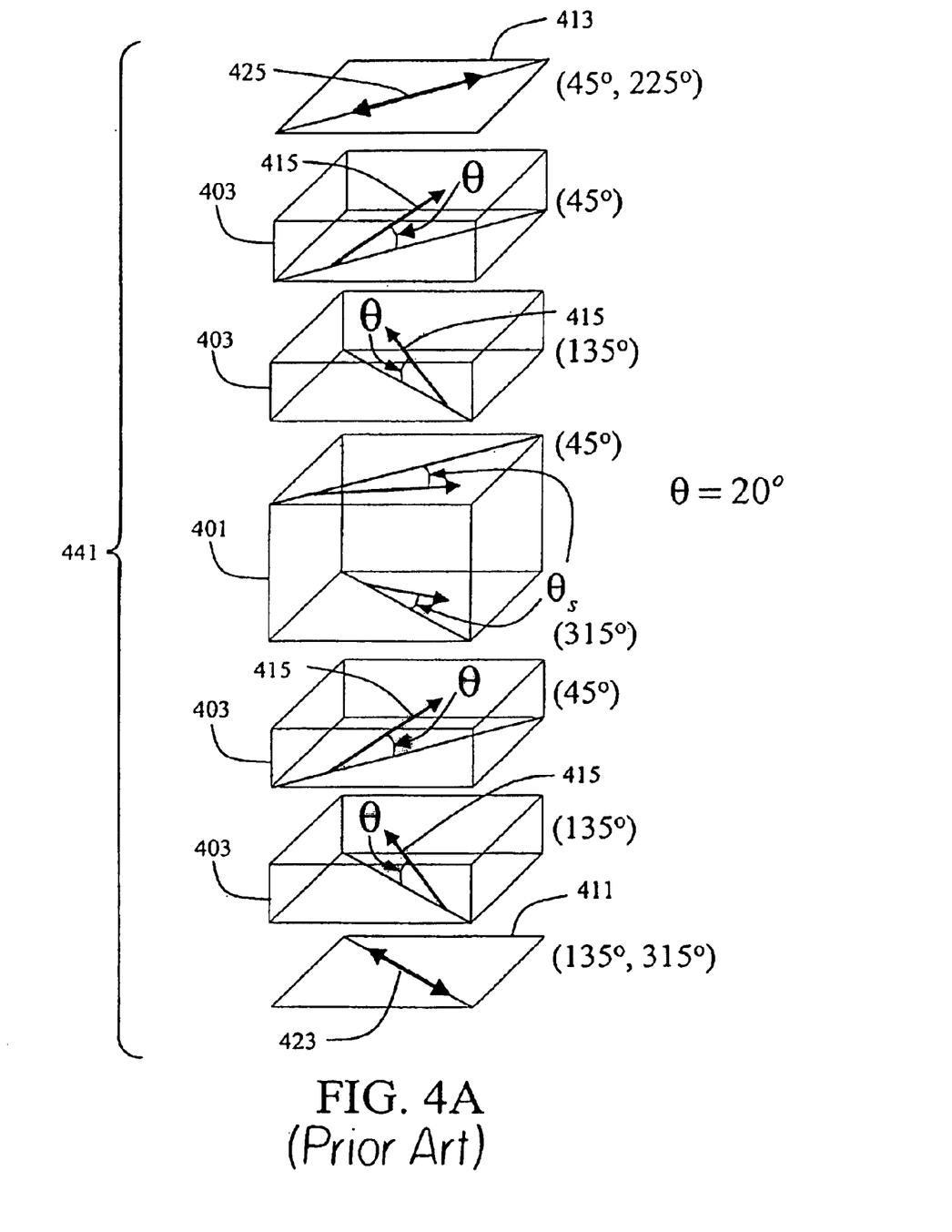
FIG. 4A is a prior art TN-LCD with O-plate compensation film (20° tilt and 60 nm)
Figure 4B:
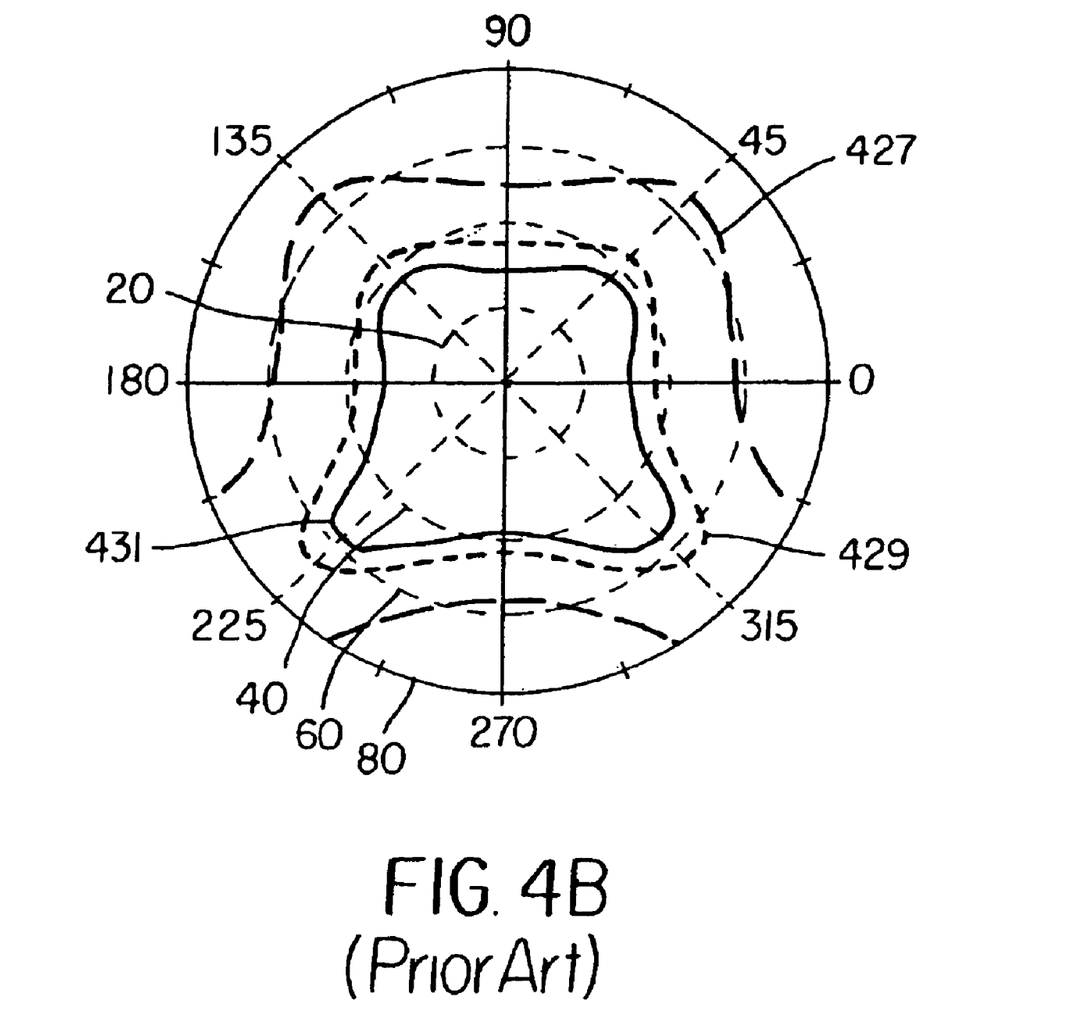
FIG. 4B is an isocontrast plot of the prior art TN-LCD shown in FIG. 4A.

Chen et al. suggested (SID99, pp.98–101 "Wide-viewing-angle photo-aligned plastic films for TN-LCDs") the use of crossed O-plate to compensate the dark state of NW-TN-LCD. The O-plate with tilt angle θ=20° is used. FIG. 4A shows structures of TN-LCD 441 with O-plates 403 (also referred as optically anisotropic layer). In addition to the liquid crystal cell 401, four O-plates are placed between crossed polarizer 411 and analyzer 413. The optic axes 415 in the O-plates tilt 20° with respect to the plate plane. The azimuthal angles of optic axes and transmission axes of analyzer and polarizer are given in the parenthesis. The azimuthal angle of O-plate is equal to that of the transmission axes 423, 425 of the polarizer 411 or the analyzer 413. FIG. 4B shows the isocontrast plot of the display 441. The lines 427, 429 and 431 are isocontrast lines of contrast ratios 10, 50 and 100 respectively. With the O-plate compensation, the viewing angle characteristic was improved. The area with contrast ratio 10 or higher expanded significantly compared to FIG. 3B.

The prior art compensators using O-plate improved the viewing angle characteristic by reducing the light leakage in the ON state. However, viewing angle characteristic in the vertical viewing direction is far from satisfactory. For example, contrast ratio becomes less than 10 for wide viewing angle range: $60° \leq \beta \leq 120°$ and $50° \leq \alpha$ with the display 441 shown in FIG. 4A. This low viewing angle characteristic in wide range limits the applications of LCD. Prior arts call for a tilt angle θ equal to or higher than 20°. It is well known in the art, however, that the repeatability in generation of high tilt angle in the manufacturing process is limited. The prior art also requires a small phase retardation value of 60 nm from the compensation film. If the birefringence of the material is 0.1, the thickness of one optically anisotropic layer would be 0.6 $\mu$m. However, from the production point of view, the uniform coating of anisotropic layer on the substrate is more of a technical difficulty if the coating thickness is smaller. As a result, the prior art O-plate compensation requiring sub-micron thickness makes the uniform coating extremely difficult. Therefore there is a strong need for new compensation film that offers better viewing angle characteristic with smaller tilt angle and larger coating thickness in optically anisotropic layers.

SUMMARY OF THE INVENTION

This compensation film improves viewing angle of twisted nematic liquid crystal display, especially in the vertical viewing direction. It also has a low average tilt angle, and large retardation value and thickness, therefore allows an easy manufacturing.

It is one of our objectives to provide a compensation film, which can be used in conjunction with a twisted nematic liquid crystal display for an improved viewing angle characteristic, especially in the vertical viewing direction.

It is another of our objectives to provide a compensation film, which has a large thickness, and therefore can be fabricated with a simpler process.

It is yet another of our objectives to provide a compensation film, which has a low average tilt angle, and therefore increases repeatability of the performance of the film.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

Figure 5A:
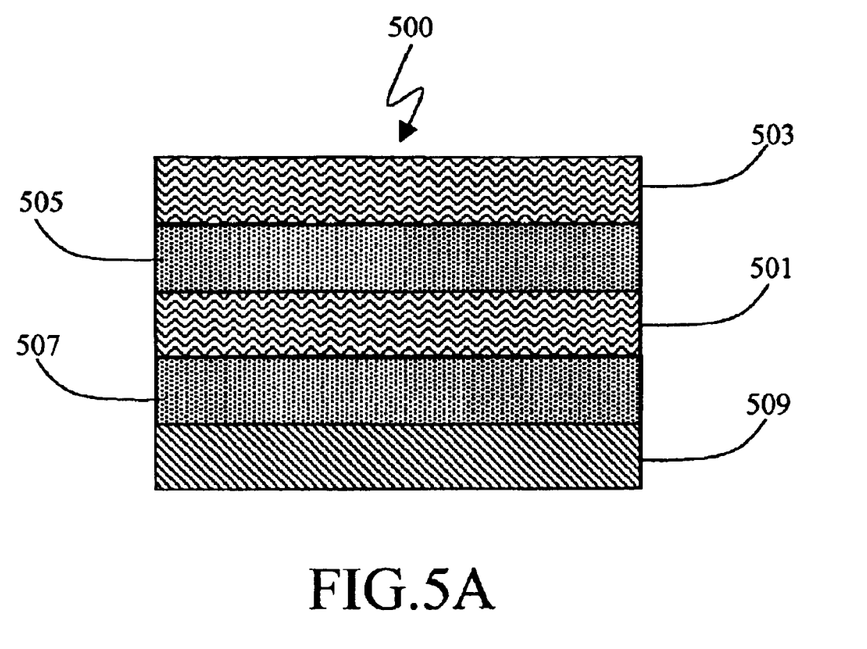
FIGS. 5A and 5B are cross sectional schematics of the compensation film of the invention.

FIG. 5A shows the cross section of the optical compensation film 500 according to the invention, which contains a positively birefringent material oriented with its optic axis tilted in a plane perpendicular to the film plane. Two birefringent material layers or optically anisotropic layers 501, 503 are deposited on the substrate 509, which is parallel to the film plane. Each optically anisotropic layer has the phase retardation value 100±20 nm defined by (ne-no)d at the wavelength of 550 nm, where ne and no are the extraordinary and ordinary refractive indices of the material, respectively, and d, the thickness of the birefringent material layer or optically anisotropic layer. The average tilt angle θ of optic axis of positively birefringent material relative to the film plane is 10±5°. The average tilt angle is the average of tilt angle over the thickness, i.e., $$\frac{\int_0^d \theta(z)\,dz}{d},$$

where θ(z) is the tilt angle at the height of z. In most cases, the average tilt angle is approximately equal to the arithmetic average tilt angles at both sides of the optically anisotropic layer.

As is well known in the art, optical materials may have up to three different principal indices of refraction and can be classified as either isotropic or anisotropic based on the relationship of these indices. When all three of its principal indices are equal, a material is considered to be isotropic. When anisotropic, a material can be either uniaxial, or biaxial. When two principal indices are equal, a material is considered to be uniaxial. A uniaxial material is uniquely characterized as having an ordinary index, referred as no, an extraordinary index ne and two angles describing the orientation of its optical axis, the axis of ne. When ne is greater than no, a uniaxial material is positively birefringent. When ne is smaller than no, a uniaxial material is negatively birefringent. Controlling birefringent behavior is particularly useful in the fabrication and application of optical films. When all three refractive indices differ, a material is considered to be biaxial, uniquely specified by its principal indices $nx_0$, $ny_0$, $nz_0$, and three orientational angles. Some of biaxial materials show weak biaxiality meaning that two of their three principal indices are very close, which is often considered equally as the ordinary refractive index for a uniaxial material. In the following, "optically anisotropic layer" is used to refer the birefringent material layer.

Still referring to FIG. 5A, substrate 509 has a function of mechanical support. The material for substrate can be polymer or other optically transparent material such as glass. Preferably, it has a small or zero birefringence in the plane of the film. Mechanically, it can take flexible or solid form as long as it has enough strength for manufacturing process and actual application. Examples of polymer are, triacetyl cellulose, polycarbonate, and polyethylene. Glass can be taken from soda-lime silicate, boro-silicate glass and other standard glasses for display application. Alignment layers 505, 507 enforce the predetermined azimuthal φ and tilt θ angles of optic axis in optically anisotropic layers 501, 503. In a typical case, the alignment direction is generated by mechanically rubbing the surface of the alignment layer. In general, the alignment layer is polymeric material such as polyvinyl alcohol or polyimide. By changing rubbing speed, rubbing pressure and other controllable parameters, one can generate prescribed angle of optic axis in optically anisotropic layers 501, 503. Also, electromagnetic radiation of the alignment layer or photo-alignment method is known to generate the specific orientation of the optic axis. In this case, the direction of optic axis in optically anisotropic layer is controlled by the material of alignment layer, amount of exposure, wavelength of radiation, thickness of alignment layer and other possible parameters. The alignment layer needs to be sensitive to the wavelength of radiation. Typically, a radiation in ultraviolet region is used for polymeric alignment layer containing UV sensitive functional group such as cinnamate group.

Figure 5B:
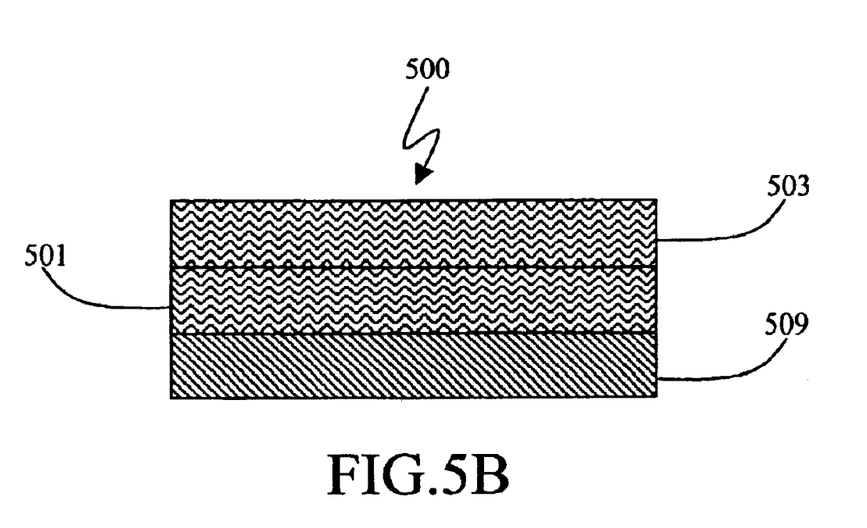

As shown in FIG. 5B, the compensation film 500 without alignment layers 505, 507 is also possible. The optic axis direction in optically anisotropic layers 501, 503 is controlled by an external force such as electric, magnetic field or shear flow forces. Then the optic axis direction is frozen by, for example, polymerization or quenching of the optically anisotropic layer while the external field is being applied.

Figure 6A:
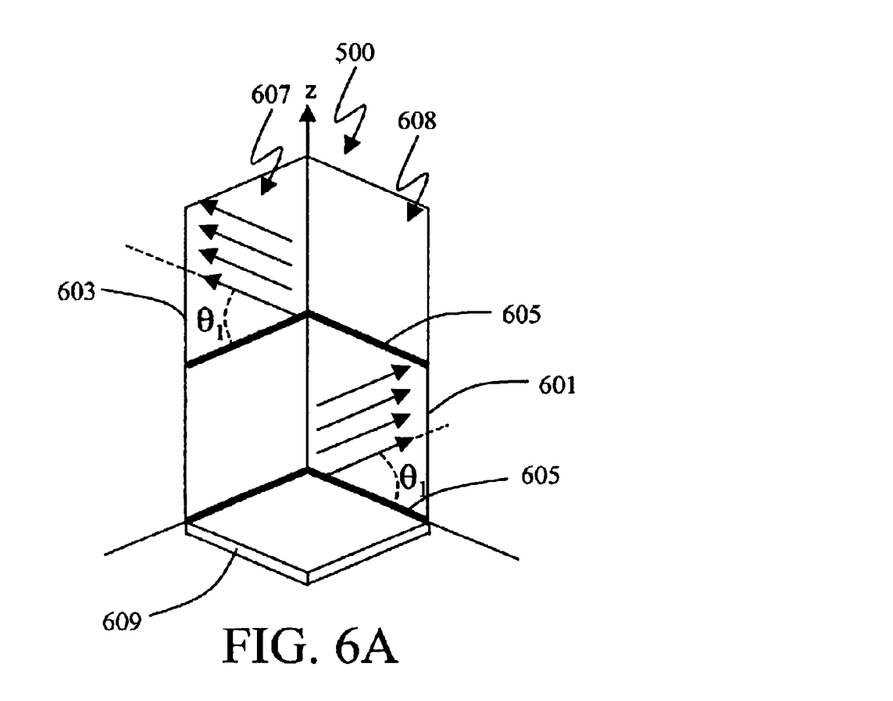
FIGS. 6A and 6B are diagrams showing the structure of the compensation film of the invention, in which the tilt of the optic axis is constant and varying across the thickness direction, respectively.
Figure 6B:
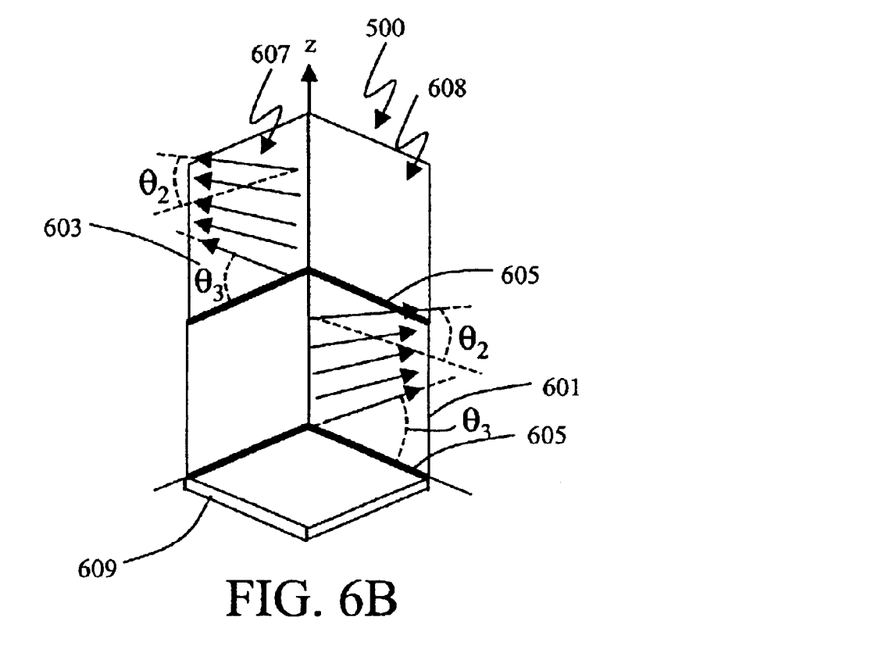

Optically anisotropic layer is characterized by the indices of refraction, thickness (or phase retardation) and the direction of optic axis. The direction of optic axis is specified by its tilt θ and azimuthal angles φ. FIG. 6A and FIG. 6B show the structure of the film 500 schematically. The optic axis of the first optically anisotropic layer 601 is tilted in the first plane 608, and the optic axis of the second optically anisotropic layer 603 is tilted in the second plane 607. Both first plane 607 and second plane 608 are perpendicular to the film plane or substrate 609. The angle formed between the first plane 607 and the second plane 608 is 90±10°. The azimuthal direction of the two optically anisotropic layers are perpendicular to each other as shown in the figures. This means that the angle formed between the two azimuthal directions is 90±10°. Two optically anisotropic layers 601, 603 are deposited on the alignment layers 605. The substrate 609 supports the whole structure. Arrows indicate the direction of optic axis in the optically anisotropic layers. The optic axis in the optically anisotropic layer tilts in the plane perpendicular to the liquid crystal cell plane and the plane of the substrate 609. The tilt angle θ may stay constant as $\theta_1$ (FIG. 6A) or vary throughout the thickness of the optically anisotropic layer from $\theta_2$ to $\theta_3$ (FIG. 6B). The azimuthal angle of optic axis in layer 601 and 603 is preferred to be constant in its layer, however, it can vary within ±10°. The azimuthal angle between the optic axes of the first layer 601 and the second layer 603 is 90±10°.

Although a compensation film having similar structure as shown in FIGS. 5A through 6B are well known, the unique optical property of the compensation film 500 according to the invention possesses desired average tilt angle $\theta$ of 10° and phase retardation value of 100 nm, which provide improved viewing angle performance of TN-LCD. In the constant case, the tilt angle is preferably in the range $5°<\theta_1<15°$ or more preferably $7.5°<\theta_1<13°$. For varying tilt angle there are two cases, one with increasing ($\theta_2>\theta_3$) and the other with decreasing ($\theta_2<\theta_3$) tilt angle. In both cases, the arithmetic average of the tilt angle is preferably in the range $5°<(\theta_2+\theta_3)/2<15°$, or more preferably $7.5°<(\theta_2+\theta_3)/2<13°$. Various tilt angle combinations, such as increasing tilt in the first optically anisotropic layer 601 and constant tilt in the second one 603 can equally function as a compensation film.

The phase retardation value of one optically anisotropic layer is given by (ne-no)d. The preferable value for the phase retardation value according to the invention is 100±20 nm at the wavelength of 550 nm. Thus, if the birefringence ne-no is 0.1, the thickness of one optically anisotropic layer is 1±0.2 $\mu$m or 1000±200 nm. This thickness 1 $\mu$m is about 67% thicker than the prior art compensation film (approximately 0.6 $\mu$m). If the birefringence ne-no is 0.11, the thickness of one optically anisotropic layer is 909±182 nm.

Figure 7A:
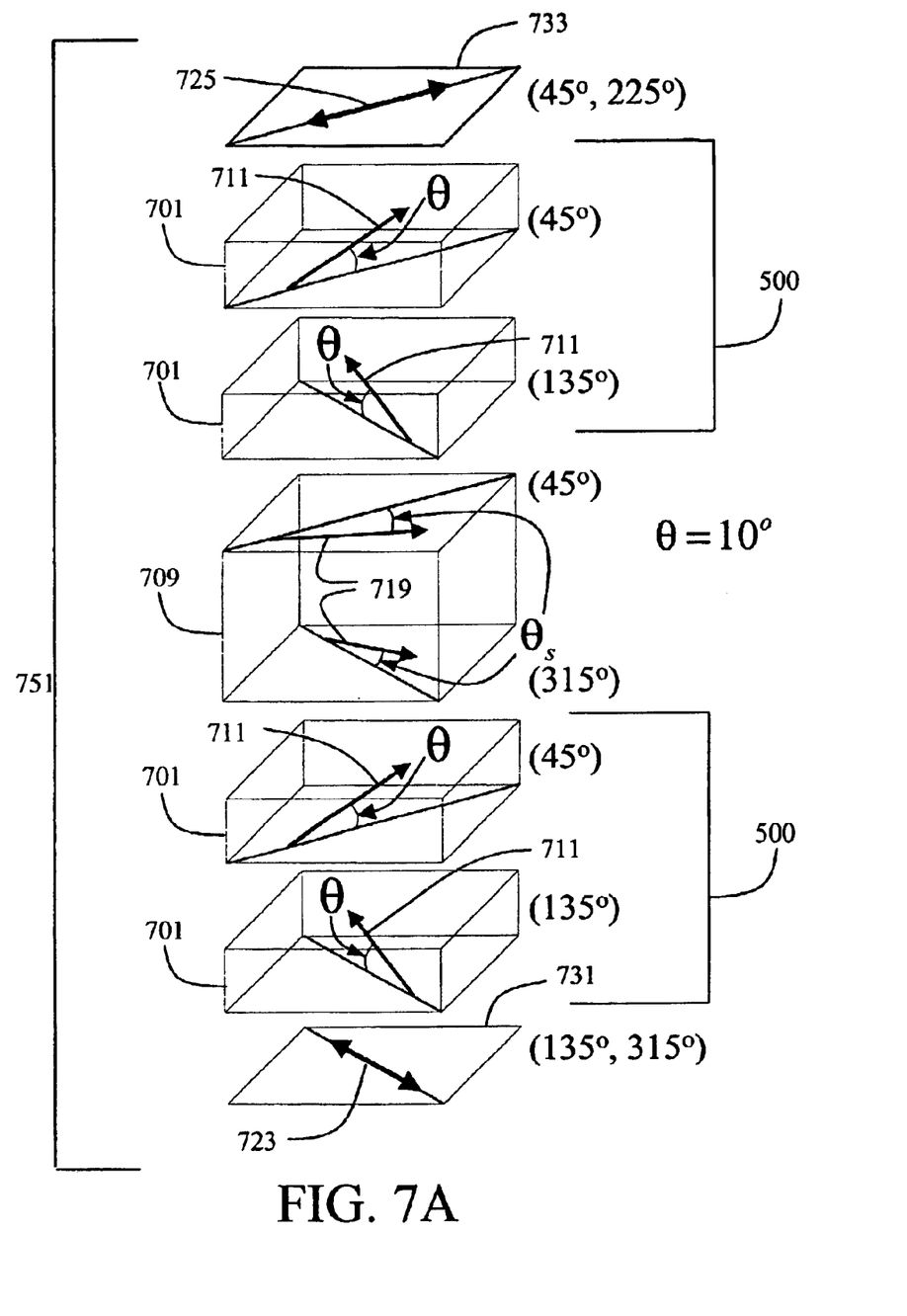
FIG. 7A is a TN-LCD with compensation film (10° tilt and 100 nm) according to the invention.

FIG. 7A is the schematic of the NW-TN-LCD 751 with the compensation film 500 according to the invention. The optically anisotropic layers 701 (corresponding to layer 601, 603 in FIGS. 6A and 6B) are shown separately, and the substrate and the alignment layers are not shown in FIG. 7A. The TN liquid crystal cell 709 is placed between two pairs of optically anisotropic layers 701. Arrows 719 indicate the direction of liquid crystal optic axis at the cell surfaces. The direction of optic axis in optically anisotropic layers is shown by the arrows 711. In the figure, the tilt angle of optic axis in optically anisotropic layer is shown as a constant, $\theta=10°$. As mentioned above, however, it can also vary. In this case, the angle $\theta$ is replaced by the average of the tilt angles $\theta_2$ and $\theta_3$ (referring to FIG. 6B). The double-headed arrows 723, 725 show the transmission axes of polarizer 731 and analyzer 733, which have azimuthal angle $\phi$ of 135° (or 315°) and 45° (or 225°), respectively. Azimuthal angles of optic axes and the transmission axes are given in the parenthesis. Optic axis of the optically anisotropic layers 701 has the same azimuthal angle $\phi$ (either 45° or 135°) as the transmission axis of polarizer or analyzer. The phase retardation (ne-no)d of the optically anisotropic layer is 100 nm.

Figure 7B:
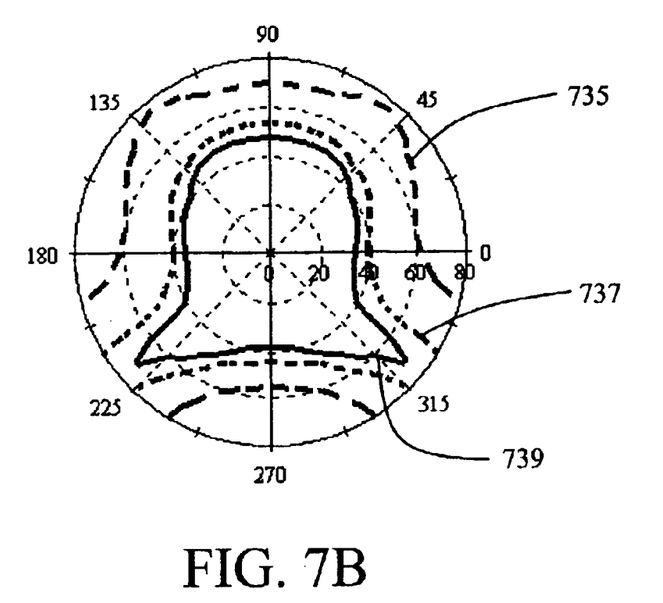
FIG. 7B is an isocontrast plot of the TN-LCD with compensation film (10° tilt and 100 nm) according to the invention.

FIG. 7B is the corresponding isocontrast plot for the display 751 shown in FIG. 7A. The lines 735, 737 and 739 are isocontrast lines with contrast ratio 10, 50 and 100, respectively.

In comparison, FIG. 4B shows the isocontrast plot of the display 441 (shown in FIG. 4A) with a prior art compensation film in which the optically anisotropic layer 403 having tilt angle $\theta=20°$ and phase retardation value of 60 nm. The lines 427, 429, 431 are isocontrast lines for contrast ratio 10, 50 and 100, respectively.

It can be seen that the area surrounded by an isocontrast line, for example line 739 (in FIG. 7B) corresponding to the contrast ratio of 100, is much larger than the areas surrounded by its counterpart 431 (in FIG. 4B). The same trend occurs for line 737 vs 429 at the contrast ratio of 50, and for line 735 vs 427 at the contrast ratio of 10.

Particular comparisons of vertical viewing angle and average viewing angle of the display 751 according to the invention and prior art display 441 are made in Table 1 and Table 2. The vertical viewing angle refers the polar viewing angle $\alpha$ when the azimuthal viewing angle $\beta=90°$ or 270°. Similarly, the horizontal viewing angle is the polar viewing angle $\alpha$ when the azimuthal viewing angle $\beta=0°$ or 180°. The average viewing angle is the average of vertical and horizontal viewing angles at a given contrast ratio. Table 1 shows the vertical viewing angle for the contrast ratio at 10, 50, and 100 in the use of the prior art compensation film 403 and the one 701 according to the invention. At the contrast ratio of 10, the vertical viewing angle of the invention is 62° compared to 52° when the prior art compensation film is used. Similarly, the vertical viewing angle with a compensation film in accordance with the current invention shows significant improvement at other contrast ratios such as 50 and 100 compared to the one with the prior art compensation film.

Table 2 shows average viewing angle (average value of polar viewing angle $\alpha$ at $\beta=0°, 90°, 180°, 270°$) that corresponds to the particular contrast ratios (10, 50, 100 and 200). A display with a better viewing angle characteristic has a larger average viewing angle of $\alpha$ at the same contrast ratio. It is demonstrated that display 751 of the invention has wider viewing angle range for the same contrast ratio in comparison to the prior art display 441. For example, average viewing angle range with contrast 10 or higher is expanded to 60° from 54°.

TABLE 1

Comparison of vertical viewing angle between the prior art compensation film and the one according to the current invention.

| Iso-Contrast | Vertical Viewing Angle Prior Art film | Vertical Viewing Angle Current Invention Film |
|---|---|---|
| 10 | 52° | 62° |
| 50 | 39° | 47° |
| 100 | 32° | 41° |
| 200 | 28° | 30° |

TABLE 2

Comparison of average viewing angle between the prior art compensation film and the one according to the current invention.

| Iso-Contrast | Average Viewing Angle Prior Art film | Average Viewing Angle Current Invention Film |
|---|---|---|
| 10 | 54° | 60° |
| 50 | 37° | 43° |
| 100 | 32° | 36° |
| 200 | 26° | 28° |

Figure 8:
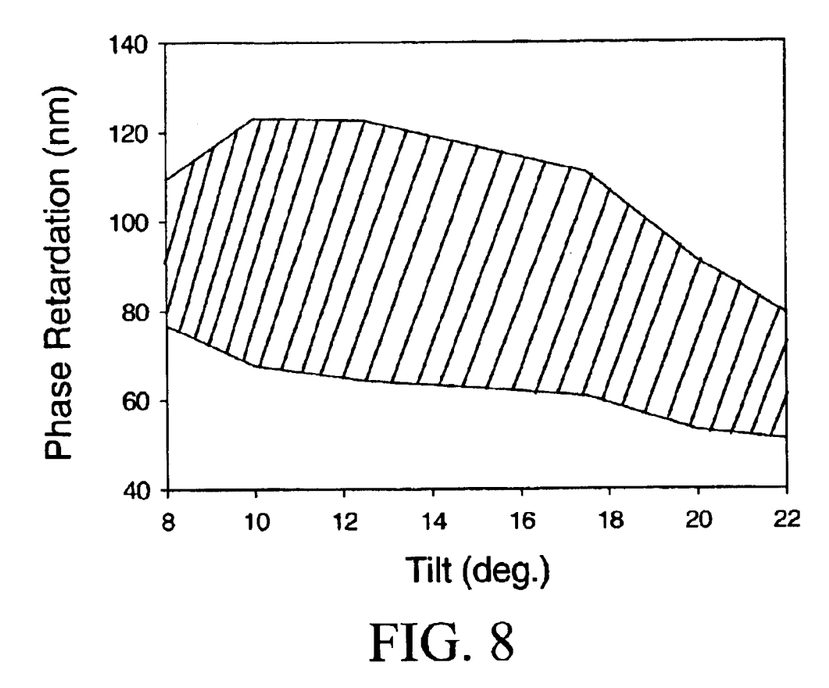
FIG. 8 shows the range of phase retardation for various tilt angles for an optically anisotropic layer. A compensation film having parameters within the shaded area allows a contrast ratio 10 line extending to polar viewing angle α=55° or higher for azimuthal viewing angle β=0°, 90°, 180° and 270°.

FIG. 8 shows parameter range of phase retardation value (ne-no)d and average tilt angle $\theta$ of the optic axis of the optically anisotropic layer (such as the layer 501, 503, 601, 603, or 701). A compensation film with parameters specified within the shaded area in the figure has contrast ratio 10 line extending to the polar viewing angle 55° in both horizontal ($\beta=0°, 180°$) and vertical ($\beta=90°, 270°$) viewing directions.

FIG. 8 reveals that the retardation value and tilt angle of a compensation film need to be optimized simultaneously.

Figure 9A:
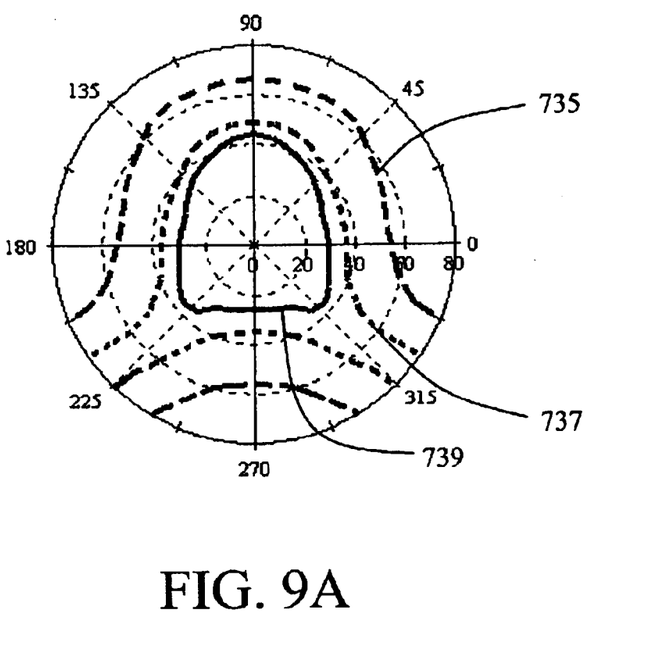
FIG. 9A is an isocontrast plot of the TN-LCD with compensation film (10° tilt and 60 nm)
Figure 9B:
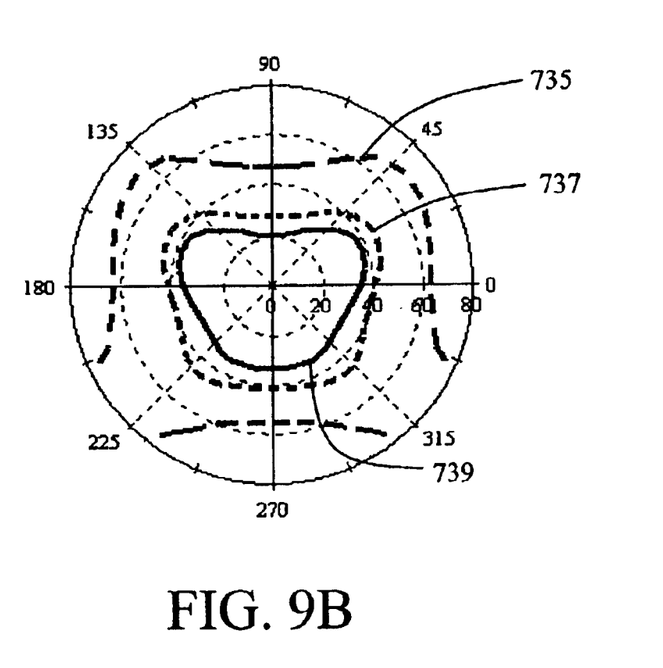
FIG. 9B is an isocontrast plot of the TN-LCD with compensation film (20° tilt and 100 nm).

When a tilt angle varies, the film phase retardation value changes its range. For example, the phase retardation runs from 75 nm to 110 nm at a tilt of 8°, while it varies between approximately 55 nm and 80 nm when the tilt is 22°. This can be better understood in comparison of isocontrast plots FIG. 4B, FIG. 7B, FIG. 9A and FIG. 9B. As discussed before, FIG. 4B shows isocontrast plot of the NW-TN-LCD with the optimized compensation film having a tilt of 20° and a phase retardation value of 60 nm, according to Chen et al. (SID99, pp.98–101 "Wide-viewing-angle photo-aligned plastic films for TN-LCDs"). As a comparison, the phase retardation value of the compensation film is changed from 60 nm to 100 nm and the tilt angle remains the same at 20° in FIG. 9A, while the tilt angle is varied from 20° to 10° in FIG. 9B and the phase retardation value is fixed at 60 nm. FIG. 9A is the isocontrast plot of the NW-TN-LCD with compensation film having a tilt of 20° and a phase retardation value of 100 nm. The tilt angle θ is 10° and the phase retardation is 60 nm for the NW-TN-LCD with isocontrast plot shown in FIG. 9B. In both figures lines 735, 737 and 739 are isocontrast lines for contrast ratio 10, 50 and 100, respectively. The areas surrounded by the isocontrast line 739 corresponding to contrast ratio of 100 in both FIGS. 9A and 9B are smaller than the area surrounded by the line 431 corresponding to the same contrast ratio of 100 in FIG. 4B, indicating that varying only one of the film parameters (retardation value and tilt) around a set of optimized parameters is not preferred. FIG. 7B shows that a much wider viewing performance is achieved when the compensation film changes its phase retardation value from 60 nm to 100 nm and the tilt from 20° to 10° simultaneously.

The prior art compensation film design favors a small phase retardation (or small thickness), therefore it is not surprising that the compensation film with tilt angle θ=20° and phase retardation value of 60 nm was discovered by Chen et al. (SID99, pp.98–101 "Wide-viewing-angle photo-aligned plastic films for TN-LCDs"). A compensation film having an even higher tilt angle between 25° and 65° was also disclosed in U.S. Pat. No. 5,619,352. FIG. 8 also shows that when only slightly adjusting one or even both of the parameters (tilt angle and phase retardation value) around the prior art design (tilt angle θ=20° and phase retardation value of 60 nm), the viewing angle characteristic actually degrades. However, it is a surprising result that, when the phase retardation value (or equally the thickness) increases by approximately 67%, and the tilt angle θ lowers by half from 20° to 10°, the compensation film offers superior viewing angle performance for a TN LCD, especially in the vertical viewing direction.

FIG. 8 also shows that an additional benefit of the compensation film according to the invention is a large tolerance on its phase retardation value evidenced by a wide band (approximately from 70 nm to 120 nm) in the axis of phase retardation value when the tilt angle is 10°. This means a large tolerance for film thickness.

The invention enables superior viewing angle performance for the TN-LCD with optically anisotropic layer having lower tilt angle and larger phase retardation value. Thus it increases the ease in manufacturing.

The invention has been described in detail with particular reference to certain preferred embodiments thereof, but it will be understood that variations and modifications can be effected within the scope of the invention.

Parts List 101 liquid crystal display
103 normal direction of display surface
105 reference direction for azimuthal angle
107 display surface
108 projection of viewing direction arrow on the display surface
109 arrow indicating the viewing direction
201 direction of optic axis specified by azimuthal angle ϕ and tilt angle θ
203 x-y-z coordinate system
301 liquid crystal cell
303 polarizer
305 analyzer
307 transmission axis of polarizer
309 transmission axis of analyzer
311 optic axes of liquid crystal at the liquid crystal cell surfaces
313 prior art Twisted Nematic liquid crystal display (TN-LCD)
315 isocontrast line corresponding to contrast ratio 10
317 isocontrast line corresponding to contrast ratio 50
319 isocontrast line corresponding to contrast ratio 100
401 liquid crystal cell
403 O-plate or optically anisotropic layer
411 polarizer
413 analyzer
415 optic axis direction in optically anisotropic layer 403
423 transmission axis of polarizer
425 transmission axis of analyzer
427 isocontrast line corresponding to contrast ratio 10
429 isocontrast line corresponding to contrast ratio 50
431 isocontrast line corresponding to contrast ratio 100
441 TN-LCD according to the prior art
500 compensation film
501 optically anisotropic layer
503 optically anisotropic layer
505 alignment layer
507 alignment layer
509 substrate
601 optically anisotropic layer
603 optically anisotropic layer
605 alignment layer
607 first plane
608 second plane
609 substrate
701 optically anisotropic layer
709 liquid crystal cell
711 optic axis of anisotropic layer
719 liquid crystal optic axis at the surface of the liquid crystal cell
723 transmission axis of polarizer
725 transmission axis of analyzer
731 polarizer
733 analyzer
735 isocontrast line corresponding to contrast ratio 10
737 isocontrast line corresponding to contrast ratio 50
739 isocontrast line corresponding to contrast ratio 100
751 TN-LCD according to the invention
ne extraordinary refractive index
no ordinary refractive index
d thickness of the optically anisotropic layer
θ tilt angle
ϕ azimuthal angle
α polar viewing angle
β azimuthal viewing angle
$θ_s$ liquid crystal tilt angle at the surfaces
$θ_1$ tilt angle
$θ_2$ tilt angle
$θ_3$ tilt angle

What is claimed is:

1. An optical compensation film comprising first and second positively birefringent materials wherein the retardation value of each of said first and said second positively birefringent materials, defined by $(n_e-n_o)d$, is $100\pm20$ nm at the wavelength of 550 nm and their optic axes are tilted in a first plane and a second plane, respectively, perpendicular to the film plane with the tilt angle $10\pm5°$, where $n_e$ and $n_o$ are the extraordinary and ordinary refractive indices, respectively, and d, the thickness of the birefringent material.

2. An optical compensation film according to claim 1 wherein the angle between the said first plane and the said second plane is $90\pm10°$.

3. An optical compensation film according to claim 1 wherein the azimuthal angle of the optic axis in the said first birefringent materials is constant with $\pm10°$, and the azimuthal angle of the optic axis in the said second birefringent materials is constant with $\pm10°$.

4. An optical compensation film according to claim 1 wherein the first and the second positively birefringent materials are disposed on a substrate.

5. An optical compensation film according to claim 4 wherein an alignment layer is disposed between the first birefringent material and the substrate.

6. An optical compensation film according to claim 5 wherein the alignment layer contains components suitable to permit orientation by a photo-alignment method.

7. An optical compensation film according to claim 5 wherein the alignment layer contains components suitable to permit orientation using mechanical rubbing.

8. An optical compensation film according to claim 5 wherein the alignment layer contains components suitable to permit orientation using an electric or magnetic field.

9. An optical compensation film according to claim 1 wherein an alignment layer is disposed between the first and the second positively birefringent material.

10. A display comprising a) a Twisted Nematic Liquid Crystal cell, b) at least one polarizing plate, and c) an optical compensation film according to claim 1.

11. A display according to claim 10 wherein the optical compensation film comprises the first and the second positively birefringent material disposed on the substrate and the azimuthal angle between the optic axis of said first and said second layer is $90\pm10°$.

12. A display according to claim 10 wherein compensation film is disposed on the both sides of Twisted Nematic Liquid Crystal cell.

13. An optical compensation film according to claim 1 wherein the thickness of the birefringent material d is $909\pm182$ nm.

14. An optical compensation film according to claim 1 wherein the tilt angle of an optic axis varies.

15. An optical compensation film according to claim 1 wherein the tilt angle of an optic axis is constant.

* * * * *